March 31, 1970  A. DELZENNE ET AL  3,503,185
PROCESS FOR THE RECOVERY OF SULFUR DIOXIDE IN RESIDUAL GASES
Filed Dec. 27, 1968
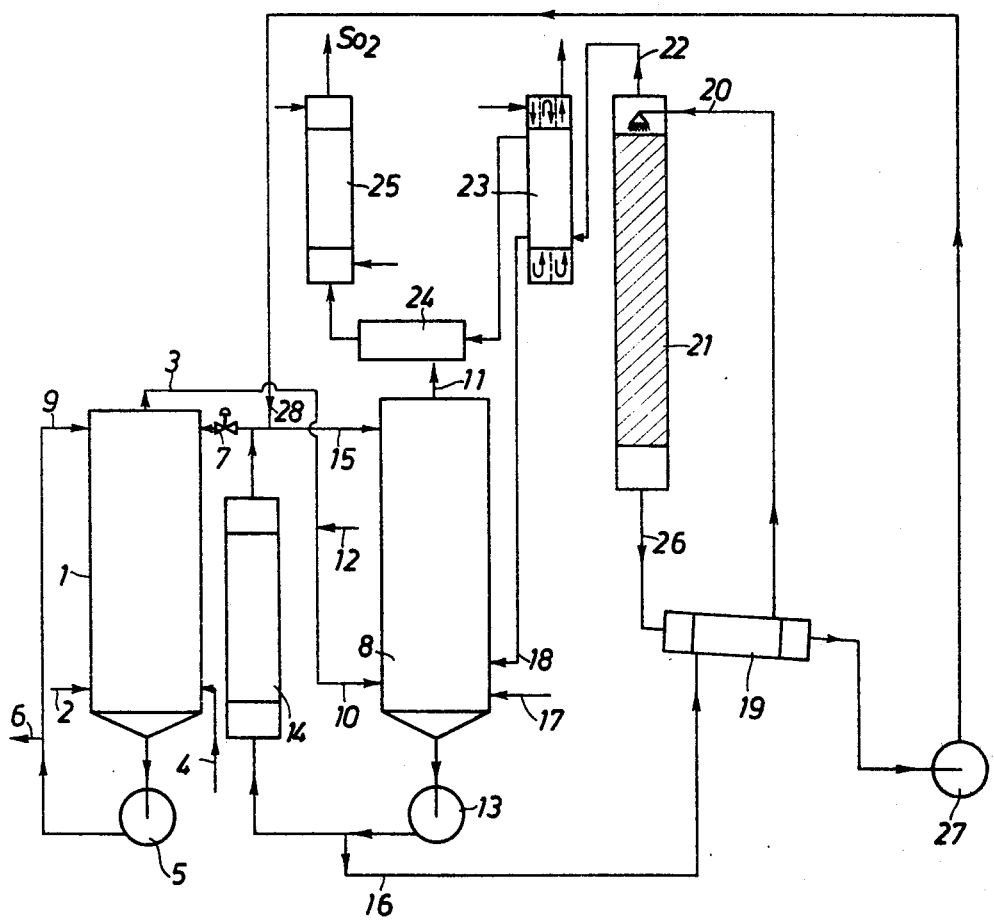
INVENTORS –
AMAND DELZENNE
RAYMOND ARMAND HAMELIN
MICHEL MARIE JAQUES OUTIN
CLAUDE PAUL RENÉ PELECIER
BY – *Hammond and Littell*
ATTORNEYS

United States Patent Office

3,503,185
Patented Mar. 31, 1970

3,503,185
PROCESS FOR THE RECOVERY OF SULFUR
DIOXIDE IN RESIDUAL GASES
Amand Delzenne, Marquette, Raymond Armand Hamelin, Neuilly, and Michel Marie Jacques Outin and Claude Paul René Pelecier, Paris, France, assignors to Societe Anonyme: Ugine Kuhlmann, Paris, and Societe Anonyme, Weiritam, France, both corporations of France
Filed Dec. 27, 1968, Ser. No. 787,518
Claims priority, application France, Dec. 28, 1967, 134,054; July 4, 1968, 157,959
Int. Cl. B01d 53/14
U.S. Cl. 55—73          10 Claims

ABSTRACT OF THE DISCLOSURE

Gases to be scrubbed, for example, boiler or thermal plant smokes, particularly for the purpose of preventing atmospheric pollution, are subjected to a pre-washing treatment by means of an aqueous sulfite lye before introducing the washed gases into a unit for absorbing $SO_2$ with ammonium sulfite and/or bisulfite solutions followed by a unit for the desorption of $SO_2$ which is recovered, the overall $SO_2$ absorption-desorption cycle being run under special conditions, taking into account the low $SO_2$ content (1000 to 5000 p.p.m.) in the gases to be treated.

---

The invention relates to a process for the recovery of sulfur dioxide contained in residual gases, such as smokes, in particular, when their $SO_2$ content is low and ranges, more particularly, from 1000 to 5000 p.p.m. (parts per million) by volume. The invention also relates to a unit for carrying out such a process in a continuous manner.

In the process according to the invention, advantage is taken of reactions whose use has already been suggested in the previous art for the treatment of gases having a certain $SO_2$ content. It is known, indeed, that aqueous solutions of ammonium sulfide or bisulfite are capable of absorbing the sulfur dioxide contained in residual gases and that the solubility of $SO_2$ is relatively high in these same solutions. Similarly, methods are also known whereby the sulfur dioxide is recovered from said solutions, the desorption of $SO_2$ being then carried out in a conventional manner by heating under vacuum.

However, the treatment of residual gases with a low $SO_2$ content raises special problems as far as obtaining optimum yields are concerned for the purpose of recovering the largest possible quantity of $SO_2$ under economic conditions. Such a problem, however, is important, especially because of present day requirements concerning the disposal of residual gases into the atmosphere in connection with the prevention of air pollution.

General indications on the previous technique will be found, in particular, in French Patent No. 1,458,016. The process described in this latter patent is based on the fact that instead of using the wet route with a large absorbing volume, a condensation of neutral ammonium sulfite is induced from the gaseous state with formation of a mist which can then be precipitated. For this purpose, this known process comprises the introduction of ammonia gas into the stream of residual gas to be scrubbed, followed by spraying of a liquid containing ammonium sulfite or ammonium bisulfite and/or ammonium sulfate into the crude gas mixed with ammonia and finally the consecutive separation of the treated gases.

In contrast to this latter process, the invention is carried out using the wet route. The invention, which applies to residual gases or smokes containing 1000 to 5000 p.p.m. of $SO_2$, improves the conventional process which consists in absorbing sulfur dioxide from smokes or gases from aqueous solutions of ammonium sulfite and/or bisulfite and in then desorbing it from these same solutions. The process according to the invention is more particularly characterized in that the gases to be scrubbed are subjected to at least one previous washing operation by the wet route by means of an aqueous sulfite lye, in that the absorption of the $SO_2$ contained in the gases thus previously washed is carried out at a temperature ranging from 20 to 55° C., while maintaining the $SO_2/NH_3$ ratio at a value ranging from 0.7 to 1, and preferably from 0.7 to 0.8 for values of the ammonium sulfite or bisulfite concentration ranging from 300 to 500 g./l., and in that the desorption of $SO_2$ is carried out consecutively at a temperature of the order of 70 to 75° C., under a reduced pressure of 650 to 700 mm. Hg, the $SO_2/NH_3$ ratio at the end of the desorption being such that the solution can be directly recycled for the purpose of absorbing additional quantities of $SO_2$, this ratio being then preferably approximately 0.7.

Due to the special operating conditions used in the process according to the invention, both efficient absorption of sulfur dioxide and quick and easy desorption of the sulfur dioxide are obtained without any loss of ammonia, which makes it possible to directly recycle depleted solutions to the absorption plant.

The previous washing suggested by this invention makes it possible to substantially remove sulfur trioxide or sulfuric acid or sulfates from gases or smokes containing them, in particular, ammonium sulfate which results from the frequent injection of ammonia into smokes in order to inhibit corosion phenomena due to the presence of $SO_3$.

It is known, indeed, that simple water wash is insufficient to remove the sulfur trioxide present in residual gases and that it is recommended to inject a sufficient quantity of ammonia gas into the gases before washing. The sulfur trioxide is thus fixed as ammonium sulfate.

It has also been found, according to this invention, that the oxidation of sulfite solutions by oxygen contained in the smokes, occurs to a significant extent only if the latter contain substances which can catalyze the oxidation reaction. These substances can be, in particular, either solids contained in the dusts, ashes, soot, etc. . . . in particular, iron or vanadium oxides, or gases nitrogen oxides. It is well known, indeed, that sulfite solutions are oxidized by these nitrogen oxides according to chemical reactions in which they act as catalysts. French Patents Nos. 707,992 and 1,336,212 may be mentioned in this respect.

Washing of the gases, which is recommended at a previous stage in this invention, may therefore also lead to a decrease in the concentration of sulfuric ions $SO_3^-$ in sulfur dioxide absorbing solutions by decreasing the content of gases in chemical combinations capable of catalyzing the oxidation of sulfite solutions.

The method proposed by the invention, i.e. previous washing of residual gases, has, therefore, a twofold function; on the one hand, it physically stops solid particles contained in the gases or smokes and on the other hand, it removes nitrogen oxides through reaction with the sulfite solution.

In the particular case where the treated gases contain significant quantities of nitrogen oxides, i.e. at least 50 p.p.m. by volume, the invention provides for washing the gases with a solution containing ammonium sulfite and/or bisulfite. The ammonium ion may be replaced, in this case, with sodium ion.

According to a particularly advantageous embodiment of the invention, that fraction of solution which is withdrawn regularly from the sulfur dioxide absorption-desorption cycle, is used for the pre-washing of gases, since that fraction indeed contains a certain quantity of ammonium sulfite and bisulfite. According to whether the withdrawal is carried out before or/and after $SO_2$ desorption, the sulfite and bisulfite composition of the solution obtained can be modified and thus adapted to the best conditions for reducing nitrogen oxides contained in the gases. Ammonium salt solutions are advantageously used having concentrations ranging from 2 to 4 moles/liter with a bisulfite ratio ranging from 0.3 to 0.5.

A dilute solution is intentionally used to prevent sulfite crystallizations in the scrubber. These crystallizations may be induced by evaporation of part of water of the solution, which decreases the temperature of the gases and by increasing the sulfate content of the solution, which significantly decreases the solubility of ammonium sulfites. It has been observed that, when the pre-washing is carried out using a sulfite or bisulfite solution, the sulfur trioxide contained in the gases can be absorbed with evolution of an equimolar quantity of sulfur dioxide $SO_2$. The latter, carried along by the gases, may be recovered in the sulfur dioxide absorbing scrubber at the same time; part of the sulfite present is also oxidized to sulfate.

Tests carried out within the scope of this invention have not made it possible to show any apparent difference in behaviour of the various nitrogen oxides. Furthermore, in practice, the latter are generally present in mixed form. It seems that, through action on the sulfite or bisulfite solution, they lead either to molecular nitrogen or to soluble combinations (nitrosyl salts, for example). In a typical example, the overall nitrogen oxide concentration was decreased by 60% (from 350 p.p.m. to 140 p.p.m.), by simple prewashing of the smokes to be treated.

The pre-washing of the gases proposed by the invention may be advantageously carried out in a scrubber of the type described in French Patent No. 1,500,130. The characteristics of the scrubber described, particularly in FIGURE 1 of the drawings appended to this latter patent, are included in this description for purposes of reference. The text and drawings of French Patent No. 1,500,130 should therefore be referred to in order to find all the structural and operational characteristics of such an apparatus.

As far as the conditions recommended for $SO_2$ absorption are concerned, using aqueous sulfite or bisulfite solutions, the invention has shown that the capacity of these solutions for absorption varies, on the one hand, with the $SO_2/NH_3$ mole ratio and, on the other hand, with dilution. It has been found that absorption efficiencies were maximum for values of the $SO_2/NH_3$ ratio ranging from 0.7 to 1 and preferably from 0.7 to 0.8 and for values of the sulfite and bisulfite concentration ranging from 300 to 500 g. per liter. A gas containing 3000 p.p.m. of $SO_2$, treated with an ammonium sulfite and bisulfite solution containing approximately 200 g. per liter of sulfite and 200 g. per liter of bisulfite, leaves the absorber at a concentration below 50 p.p.m. and the flow rate of the solution is adjusted so as to obtain liquors in which the $SO_2/NH_3$ mole ratio is very close to 1. The temperature of the gases and the flow rate of the solution must be such that the vapor pressure of these solutions is prevented from reaching a value above the $SO_2$ concentration in the gases and such that, from the top to the bottom of the apparatus, the $SO_2/NH_3$ ratio in the solutions ranges from 0.7 to 1.

The absorption is carried out in an apparatus providing intimate contact between the gas to be treated and the aqueous ammonium sulfite and/or bisulfte solutions. An apparatus suitable for the purposes of the invention is described, for example, in previously mentioned French patent No. 1,500,130.

It should be noted that it is not unusual to find traces of oxygen in the gases or smokes so that part of the sulfite is converted to ammonium sulfate. A relation has been found between the sulfate content and the absorption efficiency of the solution, and it has thus been possible to determine that the maximum permissible concentration is 50 g. of sulfate per liter. At the output of the absorber, it is therefore necessary to purge the liquors before sending them into the desorption plant so as to prevent progressive sulfate enrichment.

The sulfur dioxide enriched solutions are then introduced into a desorption column. It has been found that desorption occurs more easily as the operation is carried out under reduced pressure and the lower limit for the reduced pressure and upper limit for the temperature leading to maximum desorption without any loss of ammonia in the solutions have been determined.

To this effect, said $SO_2$ enriched solutions are introduced at the top of a column which may be packed with Raschig rings at a temperature of the order of 70-75° C. A reduced pressure of 650-700 mm. Hg is maintained in the column, and the solutions leaving through the bottom of the column are heated either directly or indirectly so as to maintain the temperature at the bottom of the column at approximately 105° C. Under these conditions, after adjustment of the quantity of heat supplied to the bottom of the column, the previously absorbed $SO_2$ is recovered and a solution is obtained at the output of the desorption column in which the $SO_2/NH_3$ mole ratio is decreased down to a value close to 0.7 so that this liquor can be directly recycled into the absorption plant.

The process according to the invention is illustrated below with reference to the appended drawing which shows an overall diagram of a plant for the recovery of $SO_2$ from smoke or residual gases.

In scrubber 1, are put into countercurrent contact, the gases to be scrubbed 2 and a sulfite liquor which, taken up by a pump 5, is sent back to the head of scrubber at 9 so as to provide a good gas-liquid contact. The liquor absorbs the sulfates present and reduces, at least in part, the nitrogen oxides. A balancing amount of water 4 and of sulfite solution 7 arrives into scrubber 1, while a purge of liquor loaded with sulfate is withdrawn at 6. The gas, cooled in the apparatus, saturated with moisture, leaves this absorber at 3 and enters at 10 into an absorber 8 after receiving at 12, a balancing amount of ammonia necessary to compensate for mechanical losses and for the $NH_3$ removed by sulfate 6. In this absorber 8, the gas comes into countercurrent contact with a sulfite solution before being removed at 11. The sulfite solution, conveyed by a pump 13, circulates in an exchanger 14 and is sent back to the head of absorber 15 after which it is received at 28, the balancing amount of regenerated liquor. Absorber 8 also receives at 18, the acid condensates of exchanger 23 and, as the case may be, a balancing amount of water 17. Part of the bisulfite liquors are purged at 16 towards the desorption column 21 and passed into an exchanger 19 before entering at 20 into desorption column 21.

The $SO_2$ evolved 22 passes into exchanger 23 where it gives up the major part of its moisture and traces of ammonia. A vacuum pump 24 provides the reduced pressure inside desorption column 21. The $SO_2$ is then taken up into exchanger 25 before leaving the plant for subsequent use. The liquor 26 leaving column 21 passes into an exchanger 19 where it gives up the major part of its calories to the liquor entering the column, before being taken up by pump 27 and reintroduced in absorption cycle 28.

The typical operating conditions for such a unit are, for example, as follows:

Crude gas temperature at scrubber 1 input 2—110–120° C.
Temperature of scrubbed gases leaving scrubber 1 at 3—48–50° C.
Temperature of pre-wash solution 9—52–55° C.
Salt concentration in scrubber 1—330 g./l.
Flow rate of lye in absorber 8—2.4 to 3 m.³/h.
Temperature of solution in absorber 8—40–45° C.
Flow rate of lye in absorber 8—2.4 to3 m.³/h.
Salt concentration in absorber 8—from 700 to 900 g./l.

Desorption column 21 liquor input temperature—70–75° C.
Desorption column 21 liquor output temperature—105–110° C.
Pressure in column 21—650–700 mm. Hg
$SO_2/NH_3$ molar ratio in liquor leaving column 21—0.7
Output temperature of exchanger 23—20° C.

The values indicated, in particular for the temperatures, can vary somewhat with the $SO_2$ content of the gases. For example, if these gases are smokes leaving a thermal plant whose power is provided by combustion of fuel oil, the values indicated for the pre-washing and absorption temperatures will vary in the plant as a function of fuel composition and plant operation (excess of air is different according to whether the plant operates at reduced or full capacity).

By way of example, 100,000 m.³/h. of residual gas containing 1400 p.p.m. of $SO_2$ by volume, 30 p.p.m. of $SO_3$ and 350 p.p.m. of nitrogen oxides, were treated in a unit of the type described, using an ammonium sulfite-bisulfite solution containing 160 g./l. of ammonium sulfite and 68 g./l. of ammonium bisulfite with a flow rate sufficient to provide a good gas-liquid contact in absorber 8 (recirculation of a relatively low amount of absorbing liquor). Analysis of the gas leaving scrubber 1 showed that the nitrogen oxide concentration fell to 140 p.p.m. that the entire $SO_3$ was removed and that the $SO_2$ content decreased by only 50 p.p.m. and returned to 1350 p.p.m. This $SO_2$ then passed into absorber 8 where it was absorbed by the ammonium sulfite-bisulfite liquor present. The bisulfite liquor was then sent to desorption column 21 and, after cooling, returned to absorption.

The $SO_2$ gas was recovered in a substantially quantitative manner. Part of the bisulfite liquor was withdrawn (to prevent an increase in the sulfate content of the solution) and after eventual addition of a balancing amount of ammonia and water to bring the sulfite-bisulfite content to the desired value, it was sent to the primary scrubber 1 which then made it possible to stop dusts, $SO_3$ and part of the nitrogen oxides. The scrubber 1 also functions to hold back any impurities which might enhance the oxidation of ammonium sulfite and bisulfite.

The process according to the invention comprises a scrubbing operation in the moist phase which may be applied successfully to the prevention of atmospheric pollution, in particular for the purpose of desulfuration of boiler smokes. Indeed, the process makes it possible not only to remove almost all of the sulfur compounds contained in boiler combustion gases, but in addition to recover in a substantially quantitative manner this sulfur as available and marketable sulfur dioxide, for example, in liquid form. The process has, in addition, the advantage of considerably decreasing the nitrogen oxide content of the combustion gases disposed of into the atmosphere. The process is of great economic value since the sale of recovered $SO_2$ covers operation costs and contributes to amortization of investments.

The pre-wash provided by the invention may, if any, be carried out in several stages, for example, two stages, before the absorption proper. The invention, therefore, must not be limited to the embodiment previously described by way of illustration only.

What we claim is:
1. Process for the recovery of sulfur dioxide contained in residual gases, the $SO_2$ content of said gases ranging from approximately 1,000 to 5,000 p.p.m. (by volume), comprising the steps of:
   (1) at least one pre-washing treatment of said residual gases using an aqueous sulfite lye, providing $SO_2$ containing prewashed gases;
   (2) absorption of said $SO_2$ contained in said gases with an aqueous solution containing an ammonium salt selected from the group consisting of ammonium sulfite and ammonium bisulfite, at a temperature ranging from approximately 20 to 55° C., the $SO_2/NH_3$ molar ratio being maintained at a value ranging from approximately 0.7 to 1 with a concentration of said ammonium salt ranging from approximately 300 to 500 g./l. in said aqueous solution, which provides an aqueous solution of ammonium salts of said $SO_2$;
   (3) desorption of said $SO_2$ from said aqueous solution of ammonium salts at a temperature ranging from 70–75° C. at a pressure of 650–700 mm. Hg, which provides an $SO_2$ free aqueous solution, the $SO_2/NH_3$ ratio in said $SO_2$ free solution being such that said solution can be recycled to the absorption step (2) above.

2. Process according to claim 1 in which said residual gases contain at least 50 parts per million (p.p.m.) by volume of nitrogen oxides, and wherein for the pre-washing step (1), an aqueous lye is used containing an ammonium salt selected from the group consisting of ammonium sulfite and ammonium bisulfite.

3. Process according to claim 1 in which said aqueous sulfite lye of step (1) contains a sodium salt selected from the group consisting of sodium sulfite and sodium bisulfite.

4. Process according to claim 1 in which for said pre-washing step (1), an aqueous sulfite lye is used which is continuously withdrawn from said aqueous solution circulating in said steps (2) and (3).

5. Process according to claim 4 in which said aqueous sulfite lye is a fraction of said aqueous solution of ammonium salts provided by step (2).

6. Process according to claim 4 in which said aqueous sulfite solution is a fraction of said aqueous solution free of $SO_2$ and provided by step (3).

7. Process according to claim 1 in which in step (1), an aqueous sulfite lye is used comprising ammonium sulfite and ammonium bisulfite, the total number of moles of said sulfite and said bisulfite ranging from 3 to 4 moles per liter of lye with the molar bisulfite:sulfite ratio ranging from 0.3 to 0.5.

8. Process according to claim 1 in which, in step (2), the molar $SO_2/NH_3$ ratio is maintained at a value ranging from about 0.7 to 0.8.

9. Process according to claim 1 in which the $SO_2/NH_3$ ratio in said solution provided by step (3) is close to 0.7.

10. Process according to claim 1 in which a fraction of said aqueous solution provided by step (2) is withdrawn regularly, for the purpose of maintaining the $SO_3^-$ ion concentration in said solution at a value below 50 g./l. of solution.

References Cited

UNITED STATES PATENTS

| | | | |
|---|---|---|---|
| 2,314,936 | 3/1943 | Guyard | 55—73 X |
| 3,260,035 | 7/1966 | Wheelock et al. | 55—73 |
| 3,403,496 | 10/1968 | Ahlander et al. | 55—73 |

FOREIGN PATENTS

| | | |
|---|---|---|
| 1,005,977 | 9/1965 | Great Britain. |

JAMES L. DECESARE, Primary Examiner

PO-1050 (5/69)

UNITED STATES PATENT OFFICE
CERTIFICATE OF CORRECTION 102.077
NLJr/hpl

Patent No. 3,503,185    Dated March 31, 1970

Inventor(s) Amand Delzenne, Raymond Armond Hamelin, Michel Marie Outin and Claude Paul-Rene Pelecier It is certified that error appears in the above-identified patent and that said Letters Patent are hereby corrected as shown below:

| PATENT | | APPLN. | | |
|---|---|---|---|---|
| Column | Line | Page | Line | |
| 4 | 72 | 10 | 8 | This line should read as follows: -- Flow rate of pre-wash lye -- 200 $m^3/h$ -- |
| | | Claim | Line | |
| 6 | 44 | 7 | 4 | Instead of "3 to 4 moles" it should read -- 2 to 4 moles -- |

SIGNED AND SEALED
NOV 17 1970

(SEAL)
Attest:

Edward M. Fletcher, Jr.
Attesting Officer

WILLIAM E. SCHUYLER, JR.
Commissioner of Patents